US012753911B1

(12) United States Patent
Ma

(10) Patent No.: US 12,753,911 B1
(45) Date of Patent: Oct. 6, 2026

(54) LAMP WITH FOLDING SELF-LOCKING STRUCTURE

(71) Applicant: MESTER LED LIMITED, Shenzhen (CN)

(72) Inventor: Erhua Ma, Shenzhen (CN)

(73) Assignee: MESTER LED LIMITED, Shenzhen (CN)

( * ) Notice: Subject to any disclaimer, the term of this patent is extended or adjusted under 35 U.S.C. 154(b) by 0 days.

(21) Appl. No.: 19/339,683

(22) Filed: Sep. 25, 2025

(30) Foreign Application Priority Data

Aug. 12, 2025 (CN) ......................... 202521704863.7

(51) Int. Cl.
*F21V 21/30* (2006.01)
*F21S 2/00* (2016.01)
*F21V 17/00* (2006.01)

(52) U.S. Cl.
CPC ............ *F21V 21/30* (2013.01); *F21V 17/005* (2013.01); *F21V 17/007* (2013.01); *F21S 2/005* (2013.01)

(58) Field of Classification Search
CPC ...... F21V 21/30; F21V 17/005; F21V 17/007; F21V 21/0885; F21V 23/06; F21V 15/01; F21V 31/005; F21V 21/005; F21V 21/02
USPC ........................................... 362/382, 375, 33
See application file for complete search history.

(56) References Cited

U.S. PATENT DOCUMENTS

2014/0126226 A1* 5/2014 Wang .................... F21V 31/005 362/375
2015/0117005 A1* 4/2015 Zanotto ..................... F21K 9/20 362/249.1
2020/0041109 A1* 2/2020 Van Der Schyf ...... A01G 9/249
2022/0136663 A1* 5/2022 Qiu ........................... F21L 4/02 362/33

* cited by examiner

*Primary Examiner* — Edwyn Labaze
(74) *Attorney, Agent, or Firm* — Westbridge IP LLC

(57) ABSTRACT

A folding self-locking structure includes a first fixing member, a hinge member, a second fixing member, two lock fasteners, and a mortise lock. A first end of the hinge member is connected to the first fixing member, the second fixing member is connected to a second end of the hinge member and is rotated to fold or unfold with the first fixing member, the two lock fasteners are provided at the second fixing member on a side close to the hinge member along a preset direction, and the mortise lock is provided in the first fixing member. When the first fixing member and the second fixing member are rotated along the hinge member to a fully unfolded state, the two lock fasteners are respectively inserted into the mortise lock to limit and self-lock.

9 Claims, 10 Drawing Sheets

LAMP WITH FOLDING SELF-LOCKING STRUCTURE

CROSS-REFERENCE TO RELATED APPLICATIONS

This application claims priority to Chinese Patent Application No. 202521704863.7, filed on Aug. 12, 2025, the entire contents of which are incorporated herein by reference.

TECHNICAL FIELD

The present application relates to the technical field of hinges, in particular to a lamp with a folding self-locking structure.

BACKGROUND

At present, hinges have been widely used in home, construction and industrial fields, such as doors, cabinet doors, wardrobe doors, drawers, windows, curtain walls, car doors, engine hoods, mechanical equipment hatches or medical equipment, etc.

A hinge is a mechanical device used to connect two objects (usually rigid components) and allow them to rotate relative to each other about a common axis, which is a core component that enables objects to open, close, fold, or rotate. Essentially, it connects two movable parts via an axis, ensuring both stable connection and flexible motion transmission. Common design flaws include jamming and noise, insufficient load-bearing capacity and deformation, excessive wear and component breakage, and installation misalignment and uneven force distribution.

Traditional 180° folding hinges have limited functionality and lack automatic limiting function when unfolded to a horizontal position. They also lack rigid support after unfolding and lack self-locking and anti-deformation capabilities. Currently, no effective solution has been proposed to address these issues.

SUMMARY

The main purpose of the present application is to provide a lamp with a folding self-locking structure, to at least solve one of the problems existing in the above-mentioned related art. The present application provides a lamp with a folding self-locking structure, including:

- a first fixing member;
- a hinge member, where a first end of the hinge member is connected to the first fixing member;
- a second fixing member connected to a second end of the hinge member and being rotated to fold or unfold with the first fixing member;
- two lock fasteners provided at the second fixing member on a side close to the hinge member along a preset direction; and
- a mortise lock provided in the first fixing member,
- when the first fixing member and the second fixing member are rotated along the hinge member to a fully unfolded state, the two lock fasteners are respectively inserted into the mortise lock to limit and self-lock, so that the first fixing member and the second fixing member form a rigid whole.

In an embodiment of the present application, a lock accessory connected to a first end of the mortise lock is provided at a first side of the first fixing member, and an elastic member connected to a second end of the mortise lock is provided at a second side of the first fixing member;

- the lock accessory has a locked state and a released state;
- in the locked state, the lock accessory applies a locking force to one end of the mortise lock so that the mortise lock is tightly matched with the two lock fasteners; and
- in the released state, after the lock accessory releases the locking force on one end of the mortise lock, an additional squeezing force is applied to the lock accessory, and the elastic member contracts due to the squeezing force, the mortise lock slides away from the lock fastener and rotates, so that the lock fastener and the mortise lock are rotated and separated along the hinge member to return to a folded state.

In an embodiment of the present application, each of the two lock fasteners is provided with a curved inclined surface on the same side, a width of the inclined surface decreases from top to bottom, and a latch hole is provided at the lock fastener;

- a lock tongue extending in a direction of the lock accessory and having a wedge-shaped protrusion is provided in the mortise lock; and
- the lock tongue and the inclined surface are progressively slidably matched, pushing the lock fastener towards the elastic member to allow the lock fastener to be continuously inserted into the mortise lock.

In an embodiment of the present application, the first fixing member is further provided with two limiting members for limiting degree of freedom of the mortise lock, and the two limiting members are located at outer edges of the mortise lock.

In an embodiment of the present application, the first fixing member includes a first U-shaped bending portion that is semi-open and has stepped shapes on both sides;

- a first enclosure is provided at one side of the first U-shaped bending portion close to the hinge member;
- a first through hole is provided at a center of the first enclosure; and
- two through slots for the lock fastener to enter and exit are symmetrically provided on both sides of the first through hole.

In an embodiment of the present application, the first U-shaped bending portion includes a first side plate and a second side plate opposite to the first side plate;

- the first side plate is provided with a countersunk hole for the lock accessory to enter and exit;
- an inner wall of the second side plate is provided with a limiting groove for limiting
- the elastic member; and
- the countersunk hole and the limiting groove are concentric.

In an embodiment of the present application, the first side plate, the second side plate, the first enclosure, a top plate and a step are enclosed to form a semi-open chamber for assembling the mortise lock, and the mortise lock is located in the semi-open chamber for directional displacement.

In an embodiment of the present application, the second fixing member includes a second U-shaped bending portion that is semi-open and has stepped shapes on both sides;

- a second enclosure is provided on a side of the second U-shaped bending portion close to the hinge member; and
- a second through hole is provided at a center of the second enclosure.

In an embodiment of the present application, two ends of the mortise lock are respectively provided with a threaded portion close to the lock accessory and an assembly hole close to the elastic member; and the threaded portion, the assembly hole and a countersunk hole are concentric.

In the embodiments of the present application, the self-lock method is adopted, when the first fixing member and the second fixing member are rotated along the hinge member to a fully unfolded state, the two lock fasteners are respectively inserted into the mortise lock to limit and self-lock, so that the first fixing member and the second fixing member form a rigid whole, thereby achieving the purpose of keeping the structure in a fixed state when fully unfolded, thereby realizing the technical effect of increasing the structural function and improving the stability of the structure in the unfolded state, and thus solving the technical problems of the traditional 180° folding hinge having a single function, no automatic limiting function when it is expanded into a horizontal state, insufficient rigid support after expansion, and lack of self-locking and anti-deformation capabilities.

DETAILED DESCRIPTION OF THE EMBODIMENTS

In order to enable those skilled in the art to better understand the present application, the following will clearly and completely describe the technical solutions in the embodiments of the present application in conjunction with the drawings in the embodiments of the present application. Obviously, the described embodiments are only part of the embodiments of the present application, not all of the embodiments. Based on the embodiments in the present application, all other embodiments obtained by ordinary technicians in this field without making creative efforts should fall within the scope of protection of the present application.

It should be noted that the terms "first", "second", and so on in the description and claims of the present application, as well as in the accompanying drawings, are used to distinguish similar items and are not necessarily used to describe a particular order or sequential sequence. It should be understood that the terms used in this manner are interchangeable where appropriate for the purposes of describing the embodiments of the present application. Furthermore, the terms "including", "comprising", and "having", as well as any variations thereof, are intended to cover non-exclusive inclusions. For example, a process, a method, a system, a product, or an apparatus including a series of steps or elements is not necessarily limited to those steps or elements expressly listed but may include other steps or elements not expressly listed or inherent to such process, method, product, or apparatus.

Furthermore, the terms "installed", "disposed", "provided with", "connecting", "connected", and "sleeved" should be interpreted broadly. For example, they can refer to fixed connections, removable connections, or integral structures; mechanical connections or electrical connections; direct connections, indirect connections through an intermediary, or internal communication between two devices, elements, or components. Those skilled in the art will understand the specific meanings of these terms in the present application based on the specific circumstances.

It should be noted that, in the absence of conflict, the embodiments and features of the embodiments in the present application can be combined with each other. The present application will be described in detail below with reference to the accompanying drawings and in combination with the embodiments.

Figure 1:
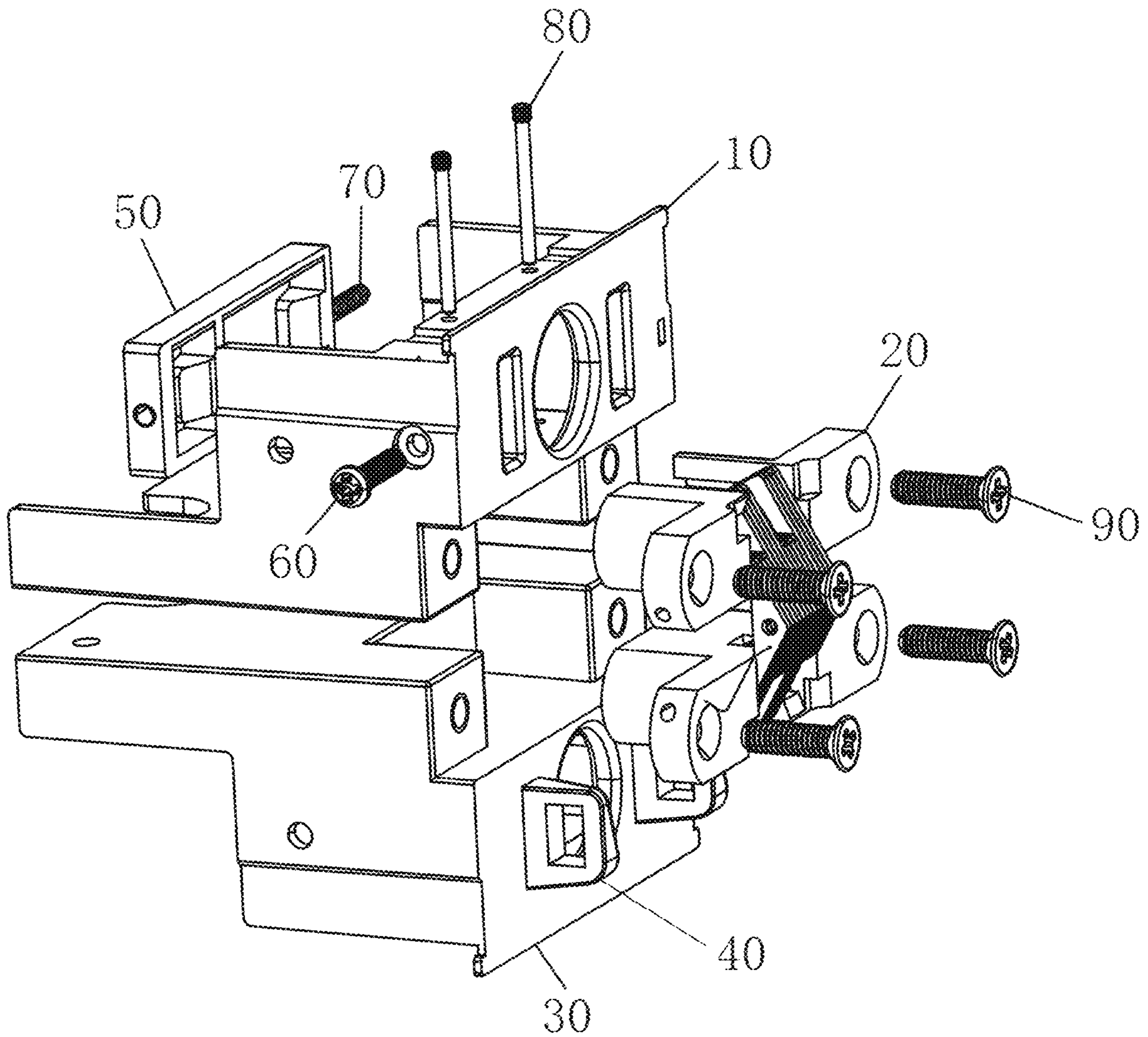
FIG. 1 is a perspective schematic view of a folding self-locking structure of the present application.

As shown in FIG. 1 to FIG. 14, the present application provides a lamp with a folding self-locking structure. As shown in FIG. 1, the folding self-locking structure A includes a first fixing member 10, a hinge member 20, a second fixing member 30, two lock fasteners 40 and a mortise lock 50. The first fixing member 10 is a main supporting base of the entire structure, which can achieve a good fixing and assembly effect. Meanwhile, the first fixing member 10 can also provide a basis and guarantee for the subsequent assembly of other components. The first fixing member 10 can be a fixing plate.

In an embodiment of the present application, an installation groove is provided on one side of the first fixing member 10 close to the hinge member 20, so as to achieve a good assembly effect with the hinge member 20 and a hidden assembly effect.

A first end of the hinge member 20 is connected to the first fixing member 10. A first end of the hinge member 20 is connected to the first fixing member 10, and a second end of the hinge member 20 is connected to the second fixing member 30, so as to realize the rotational movement between the first fixing member 10 and the second fixing member 30 for folding or unfolding. The hinge member 20 can be a hinge or a rotating shaft.

The second fixing member 30 is connected to the second end of the hinge member 20, and rotates to fold or unfold with the first fixing member 10; the second fixing member 30 is another basic part of the structure, which is associated with the first fixing member 10 through the hinge member 20 and can rotate relative to the first fixing member 10 around the hinge point.

It should be noted that when in the fully folded state, the second fixing member 30 is in contact with (or close to) the first fixing member 10; when in the fully unfolded state, the second fixing member 30 and the first fixing member 10 form a 180-degree straight line.

In an embodiment of the present application, the second fixing member 30 is provided with a mounting slot on one side near the hinge member 20. This allows for smooth assembly with the hinge member 20 and also allows for concealed assembly.

Furthermore, the first fixing member 10 and the second fixing member 30 are each connected to the hinge member 20 via a connector 90. The connector 90 can be a KM4*14 machine screw.

Furthermore, the first fixing member 10 and the second fixing member 30 are respectively provided with a plurality of mounting holes, so as to achieve a good assembly effect with other components and achieve an effect of easy assembly and disassembly.

The two lock fasteners 40 are provided at the second fixing member 30 on a side close to the hinge member 20 along a preset direction. The two lock fasteners 40 are fixed to the side of the second fixing member 30 close to the hinge member 20, and are arranged relative to each other along the preset direction. They cooperate with the mortise lock 50 on the first fixing member 10 to achieve position limiting and self-locking effects, thereby ensuring structural stability. The preset direction can be vertical or the Z-axis in a three-dimensional coordinate system.

The mortise lock 50 is provided in the first fixing member 10. The mortise lock 50 is vertically arranged inside the first fixing member 10, and is for receiving and clamping the two lock fasteners 40 on the second fixing member 30. When the first fixing member 10 and the second fixing member 30 are fully unfolded, the lock fasteners 40 are inserted into the clamping slots of the mortise lock 50 to complete the self-locking limit.

In an embodiment of the present application, the mortise lock 50 can be a latch member, which allows for easy implementation and operation.

In an embodiment of the present application, an elastic member 70 is provided at the end of the mortise lock 50 away from the lock accessory 60 to further enhance the self-locking effect of the mortise lock 50.

When the first fixing member 10 and the second fixing member 20 are rotated along the hinge member 50 to a fully unfolded state, the two lock fasteners 40 are respectively inserted into the mortise lock 50 to limit and self-lock, so that the first fixing member 10 and the second fixing member 30 form a rigid whole.

In an embodiment of the present application, in the folded state, the second fixing member 30 rotates around the hinge member 20 towards the first fixing member 10 and is retracted, or the first fixing member 10 and the second fixing member 30 simultaneously move away from the hinge member 20, and the lock fastener 40 is separated from the mortise lock 50. This structure is in a loose state and can be freely moved or retracted.

In the unfolded state, the second fixing member 30 rotates about the hinge member 20 until it is aligned with the first fixing member 10.

During the rotation process, the two lock fasteners 40 on the second fixing member 30 continuously insert into the mortise lock 50 in the first fixing member 10. Once fully unfolded, the two lock fasteners 40 on the second fixing member 30 are simultaneously and fully inserted into the mortise lock 50 in the first fixing member 10.

After the lock fastener 40 enters the mortise lock 50, the shape of the clamping slot and the lock fastener 40 match, generating a limiting and self-locking effect, fixing the two members into a rigid whole. In addition, the elastic member 70 provided at one end of the mortise lock 50 can provide a rebound force to further enhance the locking effect.

From the above description, it can be seen that, the present application achieves the following technical effects.

In the embodiments of the present application, the self-lock method is adopted, when the first fixing member 10 and the second fixing member 30 are rotated along the hinge member 20 to a fully unfolded state, the two lock fasteners 40 are respectively inserted into the mortise lock 50 to limit and self-lock, so that the first fixing member 10 and the second fixing member 30 form a rigid whole, thereby achieving the purpose of keeping the structure in a fixed state when fully unfolded, thereby realizing the technical effect of increasing the structural function and improving the stability of the structure in the unfolded state, and thus solving the technical problems of the traditional 180° folding hinge having a single function, no automatic limiting function when it is expanded into a horizontal state, insufficient rigid support after expansion, and lack of self-locking and anti-deformation capabilities.

Furthermore, a lock accessory 60 connected to a first end of the mortise lock 50 is provided at a first side of the first fixing member 10, and an elastic member 70 connected to a second end of the mortise lock 50 is provided at a second side of the first fixing member 10.

The lock accessory 60 has a locked state and a released state. In the locked state, the lock accessory 60 applies a locking force to one end of the mortise lock 50 so that the mortise lock 50 is tightly matched with the two lock fasteners 40. In the released state, after the lock accessory 60 releases the locking force on one end of the mortise lock 50, an additional squeezing force is applied to the lock accessory 60, and the elastic member 70 contracts due to the squeezing force, the mortise lock 50 slides away from the lock fastener 40 and rotates, so that the lock fastener 40 and the mortise lock 50 are rotated and separated along the hinge member 20 to return to a folded state. It can be understood that the lock accessory 60 is mounted on one side of the first fixing member 10 and connected to one end of the mortise lock 50. It has two states: 1. A locked state, in which a locking force is applied to the mortise lock 50, making the mortise lock 50 and the lock fastener 40 more tightly locked. 2. A released state, in which no locking force is applied and the mortise lock 50 can also function as a push pin. When an external force is applied, the mortise lock 50 moves toward one end of the elastic member 70, releasing the lock fastener 40, and facilitating the separation of the first fixing member 10 and the second fixing member 30.

The elastic member 70 is mounted on the other end of the first fixing member 10 and connected to the other end of the mortise lock 50. This member provides a rebound force when the applied external force is removed, pushing the mortise lock 50 back into place.

In an embodiment of the present application, the lock accessory 60 may be a PM3*12 machine screw.

In an embodiment of the present application, the elastic member 70 may be a spring.

Furthermore, each of the two lock fasteners 40 is provided with a curved inclined surface 401 on the same side, a width of the inclined surface 401 decreases from top to bottom, and a latch hole 402 is provided at the lock fastener 40.

A lock tongue 501 extending in a direction of the lock accessory 60 and having a wedge-shaped protrusion is provided in the mortise lock 50.

The lock tongue 501 and the inclined surface 401 are progressively slidably matched, pushing the lock fastener 40 towards the elastic member 70 to allow the lock fastener 40 to be continuously inserted into the mortise lock 50. It can be understood that, the lock fastener 40 has an inclined surface 401 (curved, with decreasing width from top to bottom) on the side that contacts the mortise lock 50.

A wedge-shaped lock tongue 501 is located inside the mortise lock 50, pointing toward the lock accessory 60.

Specifically, when unfolded, the inclined surface 401 contacts the lock tongue 501 and gradually slides, pushing the mortise lock 50 toward the elastic member 70. The lock fastener 40 continues to penetrate deeper into the mortise lock 50, achieving smooth and reliable self-locking.

To achieve automatic guidance, the wedge-shaped fit between the inclined surface 401 and the lock tongue 501 guides the lock fastener 40 automatically into the clamping slot, eliminating the need for precise alignment.

The progressive sliding fit reduces insertion resistance and extends component life.

The wedge-shaped lock tongue 501 generates lateral pressure upon insertion, ensuring a more secure fit between the lock fastener 40 and the mortise lock 50.

Furthermore, the first fixing member 10 is further provided with two limiting members 80 for limiting degree of freedom of the mortise lock 50, and the two limiting members 80 are located at outer edges of the mortise lock 50. It can be understood that by limiting the degree of freedom of the mortise lock 50 in the non-working direction and allowing it to move only in the designed direction (the direction of the lock accessory 60 and the elastic member 70), it can prevent shaking and prevent the mortise lock 50 from loosening due to vibration after being locked; it can also accurately position the mortise lock 50 to ensure that it is aligned with the lock fastener 40 each time it is unfolded; and, it extends its service life and reduces friction damage caused by deviation.

In an embodiment of the present application, the limiting member 80 may be a pin.

Figure 10:
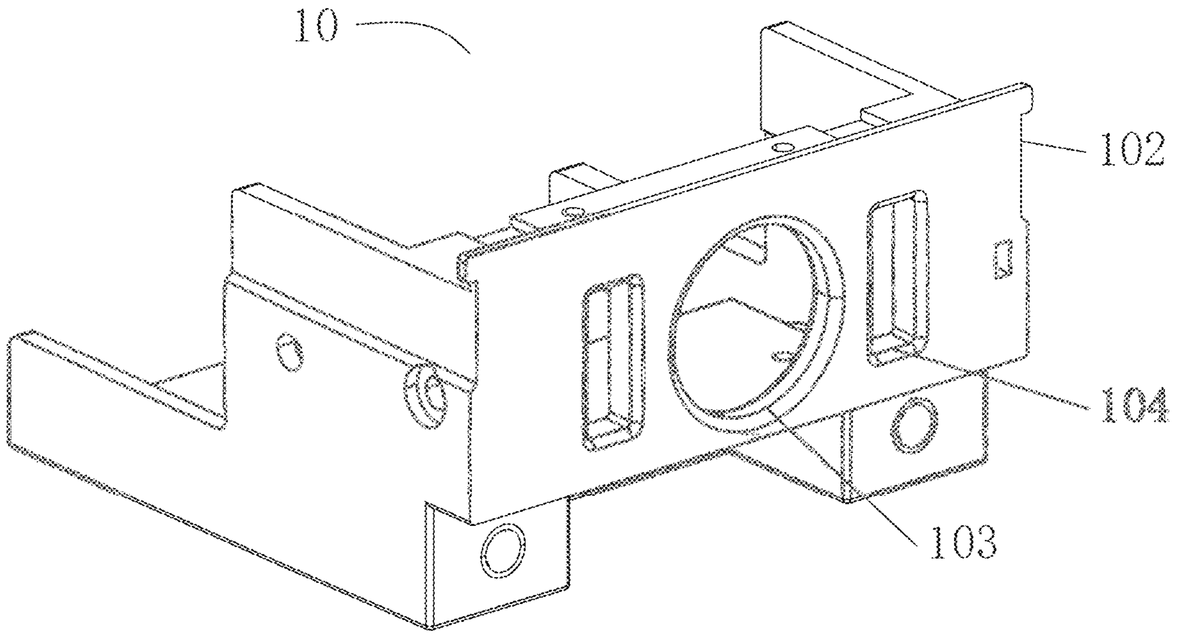
FIG. 10 is a perspective schematic view of a first fixing member of the folding self-locking structure of the present application.

As shown in FIG. 10, the first fixing member 10 includes a first U-shaped bending portion 101 that is semi-open and has stepped shapes on both sides. A first enclosure 102 is provided at one side of the first U-shaped bending portion 101 close to the hinge member 20. A first through hole 103 is provided at a center of the first enclosure 102. Two through slots 104 for the lock fastener 40 to enter and exit are symmetrically provided on both sides of the first through hole 103. It can be understood that the effect of facilitating assembly can be achieved, and the effect of reducing the weight of the first fixing member 10 can be achieved.

Figure 11:
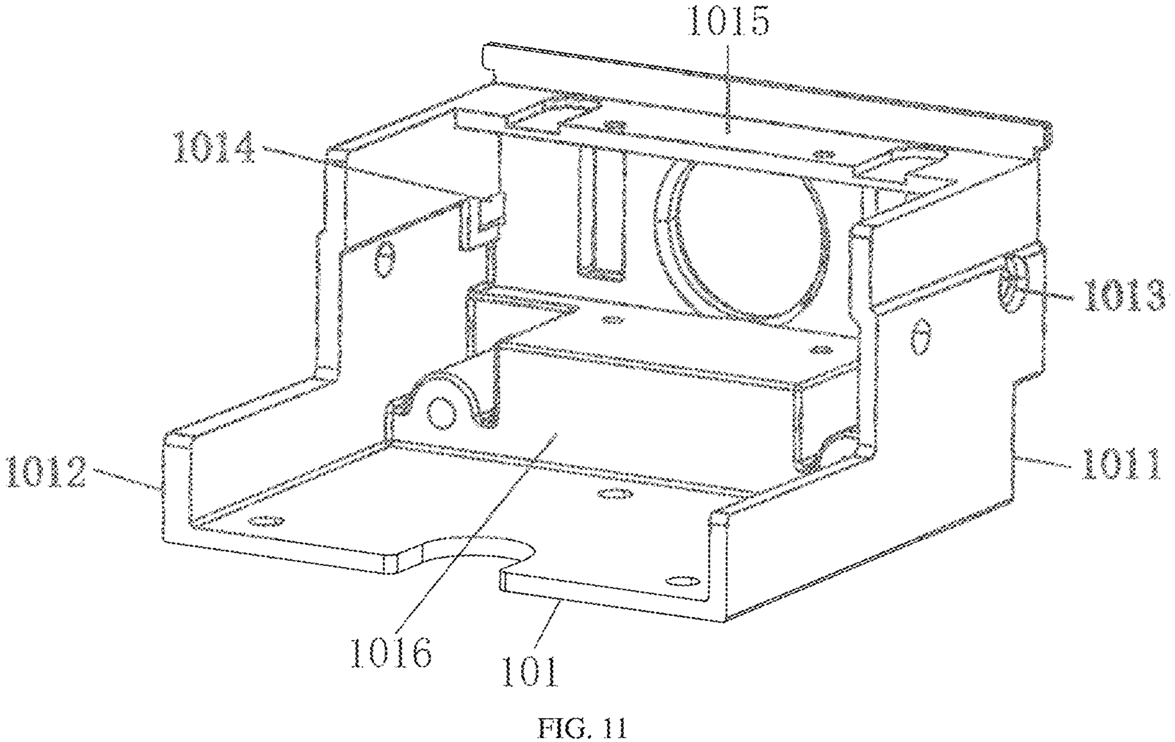
FIG. 11 is a perspective schematic view of the first fixing member of another folding self-locking structure of the present application.

As shown in FIG. 11, the first U-shaped bending portion 101 includes a first side plate 1011 and a second side plate 1012 opposite to the first side plate 1011. The first side plate 1011 is provided with a countersunk hole 1013 for the lock accessory 60 to enter and exit. An inner wall of the second side plate 1012 is provided with a limiting groove 1014 for limiting the elastic member 70.

The countersunk hole 1013 and the limiting groove 1014 are concentric. It can be understood that a good assembly effect can be achieved, and the internal locking structure can be hidden to prevent dust from entering, thereby improving service life and aesthetics.

Furthermore, the first side plate 1011, the second side plate 1012, the first enclosure 102, a top plate 1015 and a step 1016 are enclosed to form a semi-open chamber for assembling the mortise lock 50, and the mortise lock 50 is located in the semi-open chamber for directional displacement. It can be understood that the semi-open chamber structure facilitates direct embedding of components such as the mortise lock 50 and the elastic member 70, thereby facilitating assembly; at the same time, it also enables the mortise lock 50 to move in a directional manner.

Figure 6:
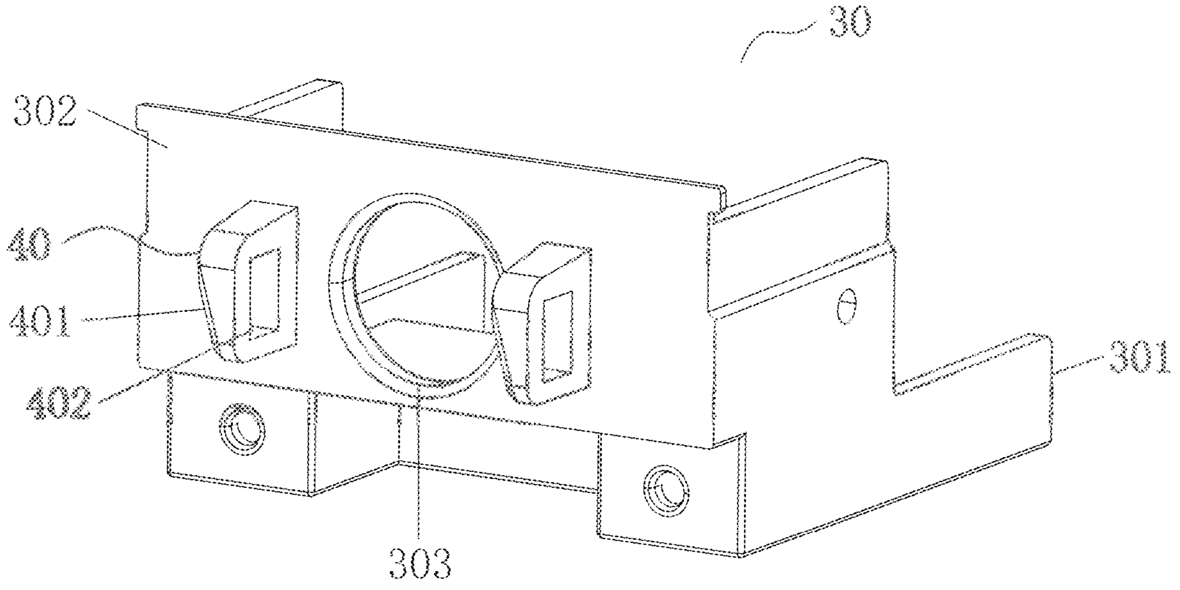
FIG. 6 is a perspective schematic view of a second fixing member of the folding self-locking structure of the present application.

As shown in FIG. 6, the second fixing member 30 includes a second U-shaped bending portion 301 that is semi-open and has stepped shapes on both sides. A second enclosure 302 is provided on a side of the second U-shaped bending portion 301 close to the hinge member 20. A second through hole 303 is provided at a center of the second enclosure 302. It can be understood that the effect of facilitating assembly can be achieved, and the effect of reducing the weight of the second fixing member 30 can be achieved.

Figure 9:
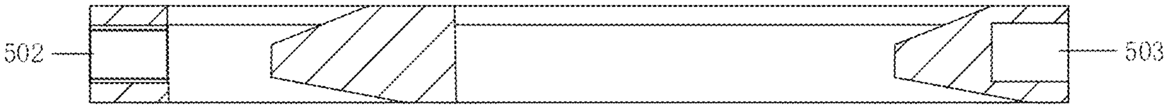
FIG. 9 is a cross-sectional view of the mortise lock of the folding self-locking structure of the present application along A-A.

As shown in FIG. 9, two ends of the mortise lock 50 are respectively provided with a threaded portion 502 close to the lock accessory 60 and an assembly hole 503 close to the elastic member 70.

The threaded portion 502, the assembly hole 503 and a countersunk hole 1013 are concentric. It can be understood that it can ensure that the mortise lock 50, the lock accessory 60, and the elastic member 70 are coaxially installed, reducing eccentric wear. The assembly hole 503 and the limiting groove 1014 can achieve a good assembly effect of the elastic member 70.

In an embodiment of the present application, when in the unfolded state, the second fixing member 30 rotates around the hinge member 20 and is aligned with the first fixing member 10. The inclined surface 401 contacts the lock tongue 501, gradually pushing the lock fastener 40 into the mortise lock 50 to complete the self-locking. The lock accessory 60 is tightened and is in a locked state to further prevent loosening.

When in the folded state, the lock accessory 60 is loosened to switch to the released state; external force is applied, such as pressing the lock accessory 60 to push the mortise lock 50 towards the elastic member 70 to separate it from the lock fastener 40; the second fixing member 30 can be freely folded and recovered.

The installation process of the folding self-locking structure A of the present application is as follows.

Figure 2:
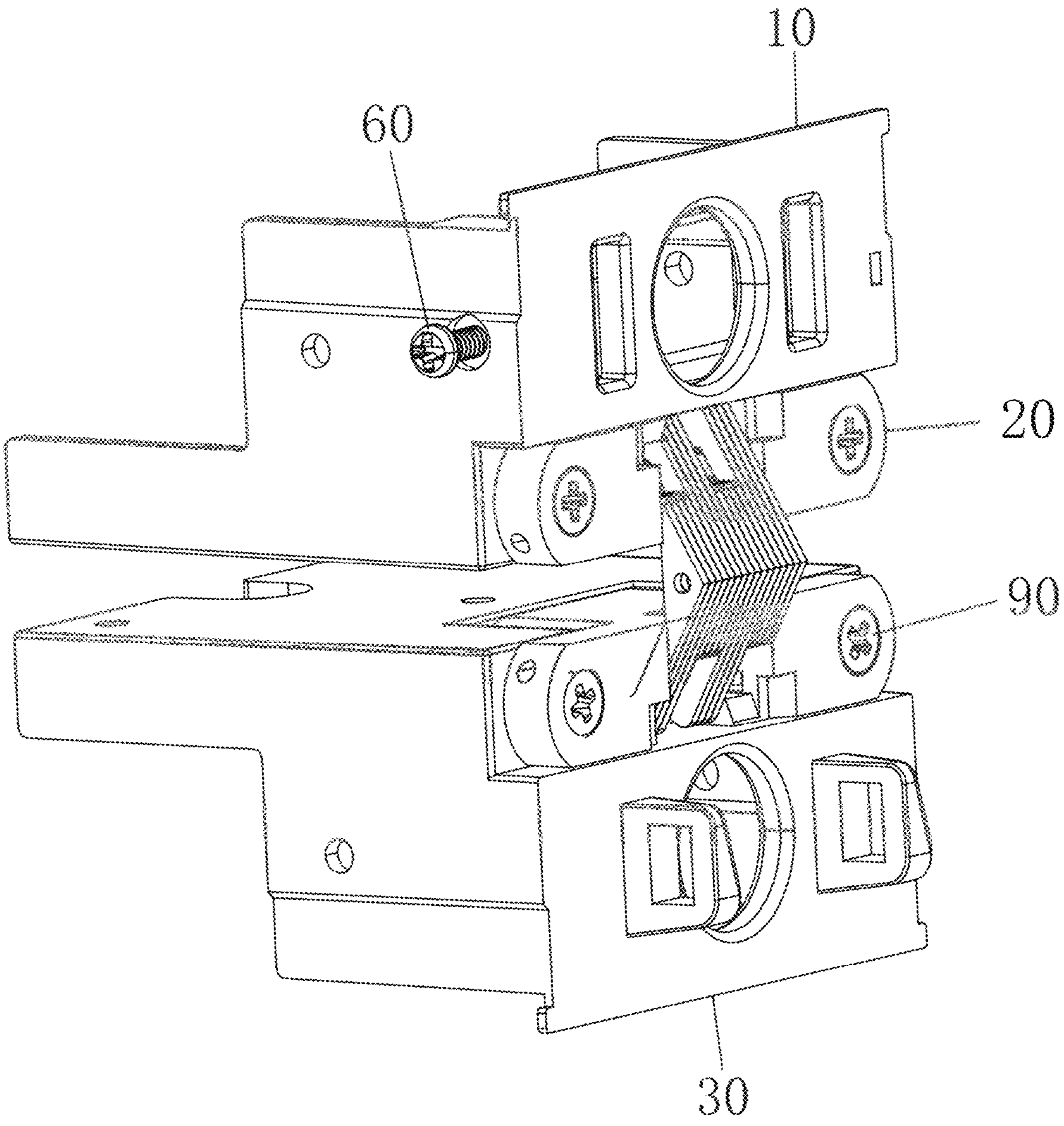
FIG. 2 is a schematic view of the assembly of the folding self-locking structure of the present application.

Firstly, as shown in FIG. 2, align the mounting holes of the hinge member 20 and the first fixing member 10 and tighten them with KM4*14 machine screws.

Secondly, use the same method to lock the hinge member 20 to the second fixing member 30.

Figure 3:
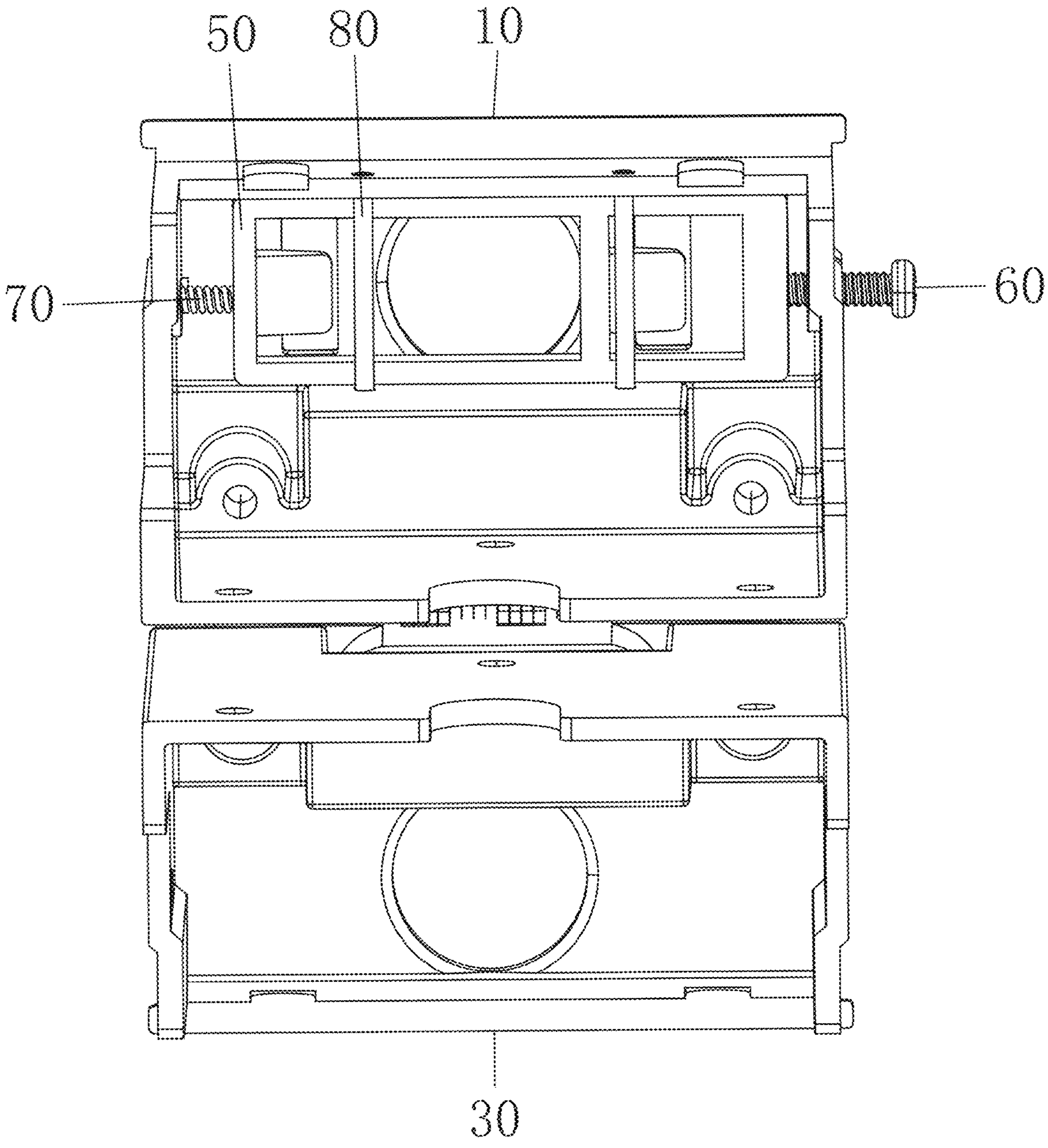
FIG. 3 is a schematic view of another assembly of the folding self-locking structure of the present application.

Thirdly, as shown in FIG. 3, insert the elastic member 70 into the circular groove of the mortise lock 50, then, install the mortise lock 50 and the elastic member 70 together into the square groove of the first fixing member 10.

Lastly, insert the lock accessory 60 through the through hole of the first fixing member 10 and lock it into the threaded hole of the mortise lock 50, finally, install the limiting member 80.

The specific working principle of the present application is as follows.

Figure 4:
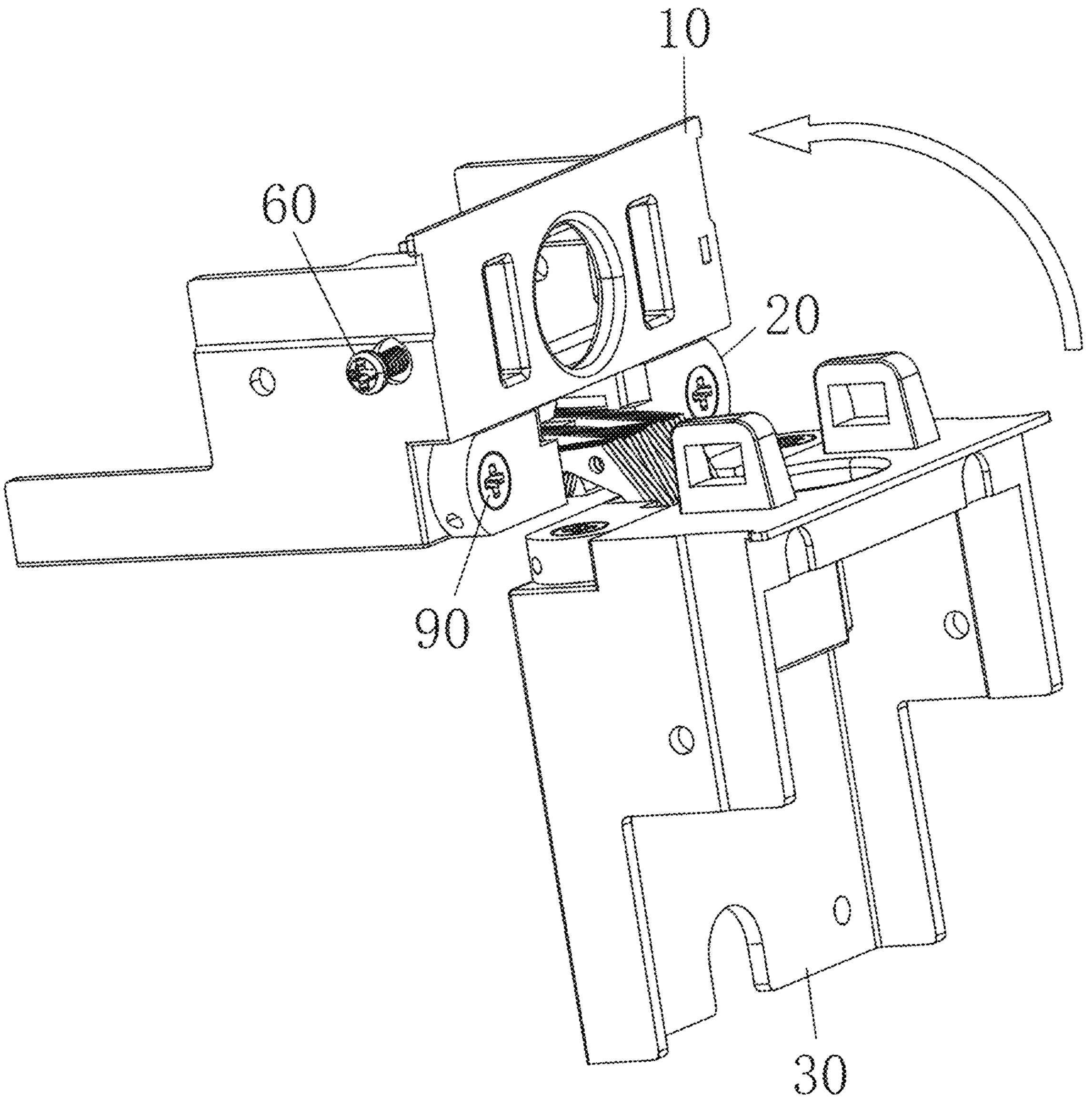
FIG. 4 is a perspective schematic view of the folding self-locking structure of the present application in a folded state.

Firstly, as shown in FIG. 2, the structure is initially in a folded state. With the first fixing member 10 stationary, the second fixing member 30 is rotated, and the folded structure is now in the process of unfolding, as shown in FIG. 4.

Figure 5:
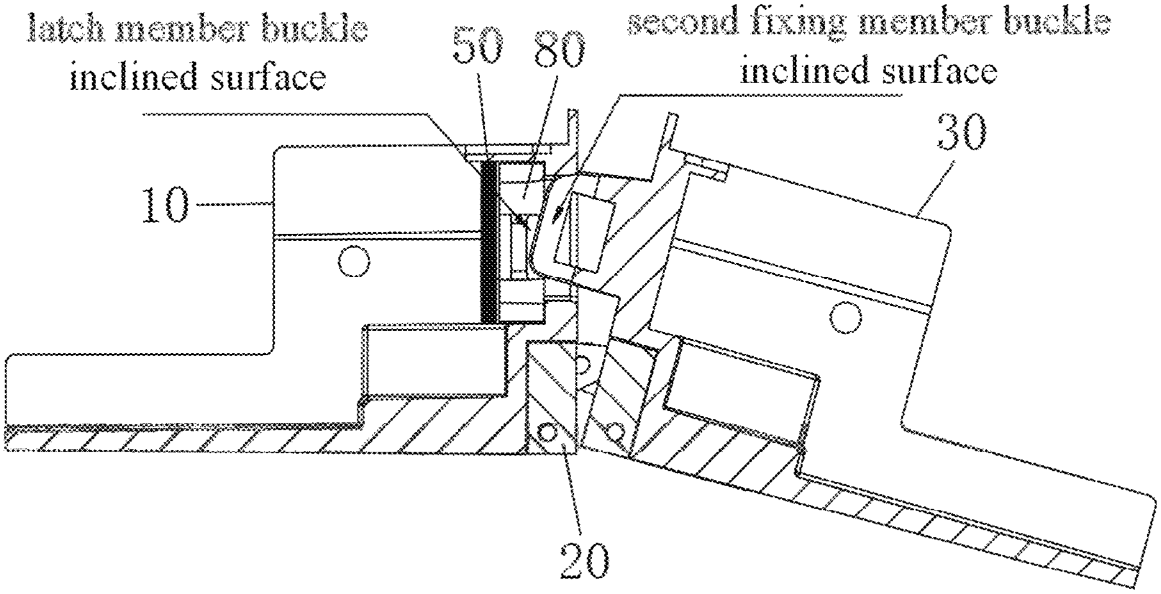
FIG. 5 is a perspective schematic view of the folding self-locking structure of the present application in an unfolded state.
Figure 7:
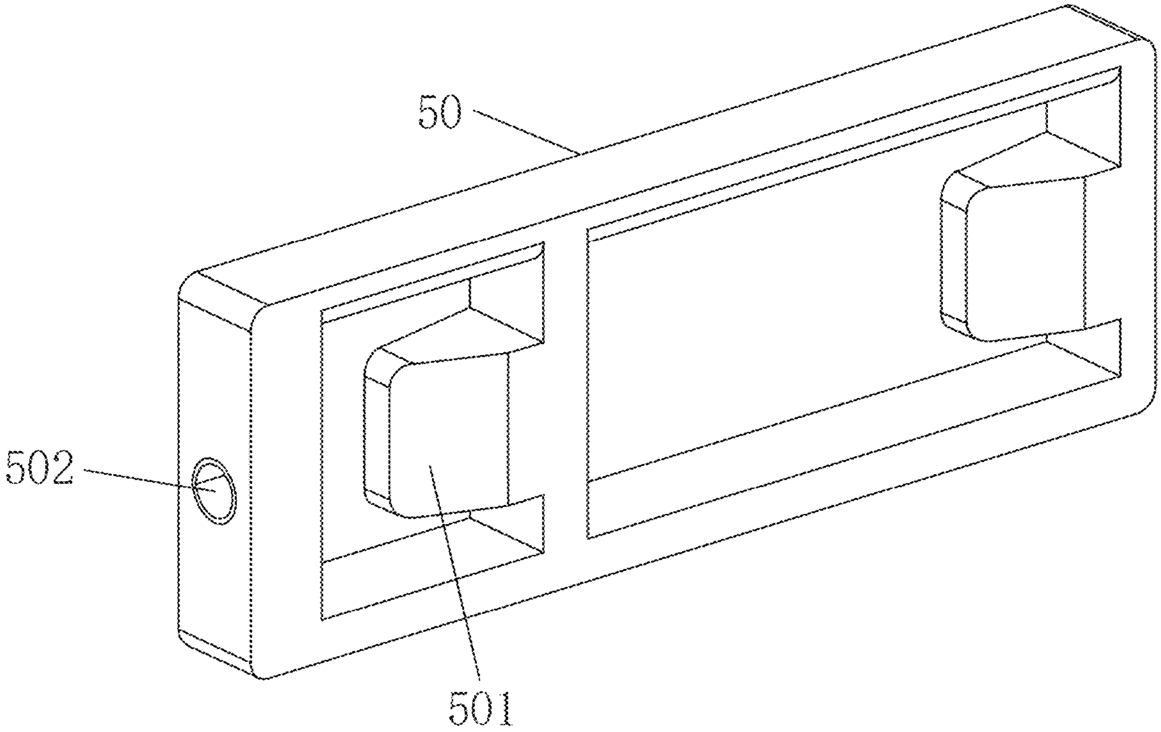
FIG. 7 is a perspective schematic view of a mortise lock of the folding self-locking structure of the present application.
Figure 8:
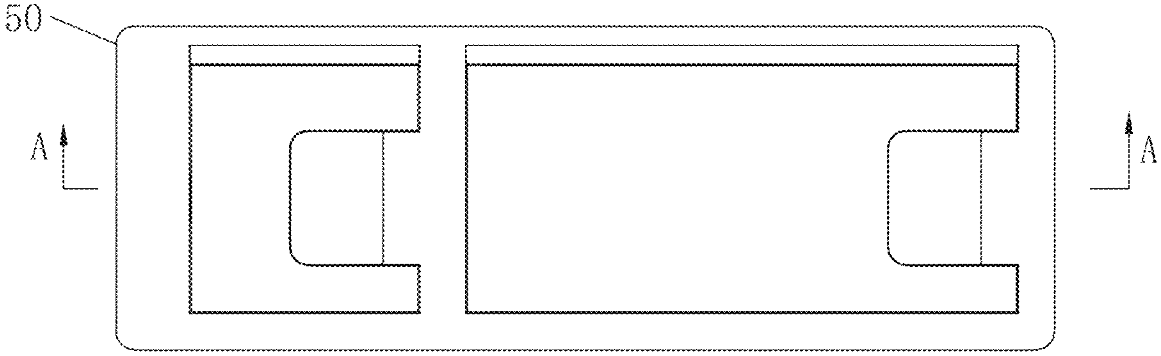
FIG. 8 is a front view of the mortise lock of the folding self-locking structure of the present application.

Secondly, as shown in FIG. 5, when the folding structure is unfolded to a certain angle, the lower side of the locking member 40 on the second fixing member 30 will first contact the inclined surface of the lock tongue 501. As shown in FIG. 6, the lock fastener 40 on the second fixing member 30 is wide at the top and narrow at the bottom, and the inclined surface has a certain curvature. The lock tongue 501 on the mortise lock 50 is wedge-shaped, as shown in FIG. 7. At this time, the folding structure continues to unfold, and the lower side of the lock fastener 40 on the second fixing member 30 squeezes the tip of the lock tongue 501, causing the mortise lock 50 to move towards the elastic member 70. At this time, the elastic member 70 is continuously squeezed and deformed as the folding structure unfolds.

Thirdly, when the folding structure is unfolded to a horizontal state, the latch hole 402 of the second fixing member 30 moves to align with the lock tongue 502. Since the lock tongue 502 is no longer squeezed by the lock fastener 40 on the second fixing member 30, the mortise lock 50 will be inserted into the latch hole 402 of the second fixing member 30 under the spring force of the elastic member 70, thereby realizing the self-locking function.

Figure 12:
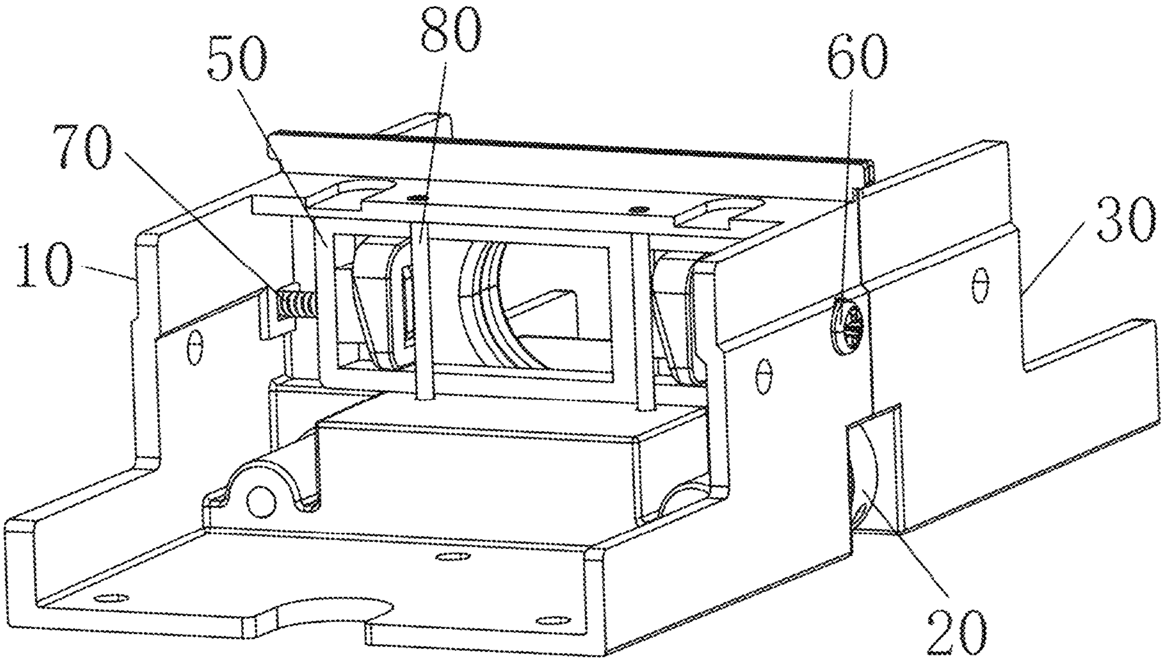
FIG. 12 is a schematic view of the folding self-locking structure of the present application in a fully unfolded state.

Fourthly, as shown in FIG. 12, when the folding structure is unfolded to a horizontal position, the lock fastener 40 on the second fixing member 30 becomes the force bearing point of the horizontal rigid support, working together with the hinge member 20 to form the first fixing member 10 and the second fixing member 30 into a rigid whole. At this time, tighten the lock accessory 60 with a Phillips screwdriver, causing the lock tongue 501 on the mortise lock 50 to move in the tightening direction, thereby strengthening the locking force of the mortise lock 50 and making the overall structure more tightly connected.

Figure 13:
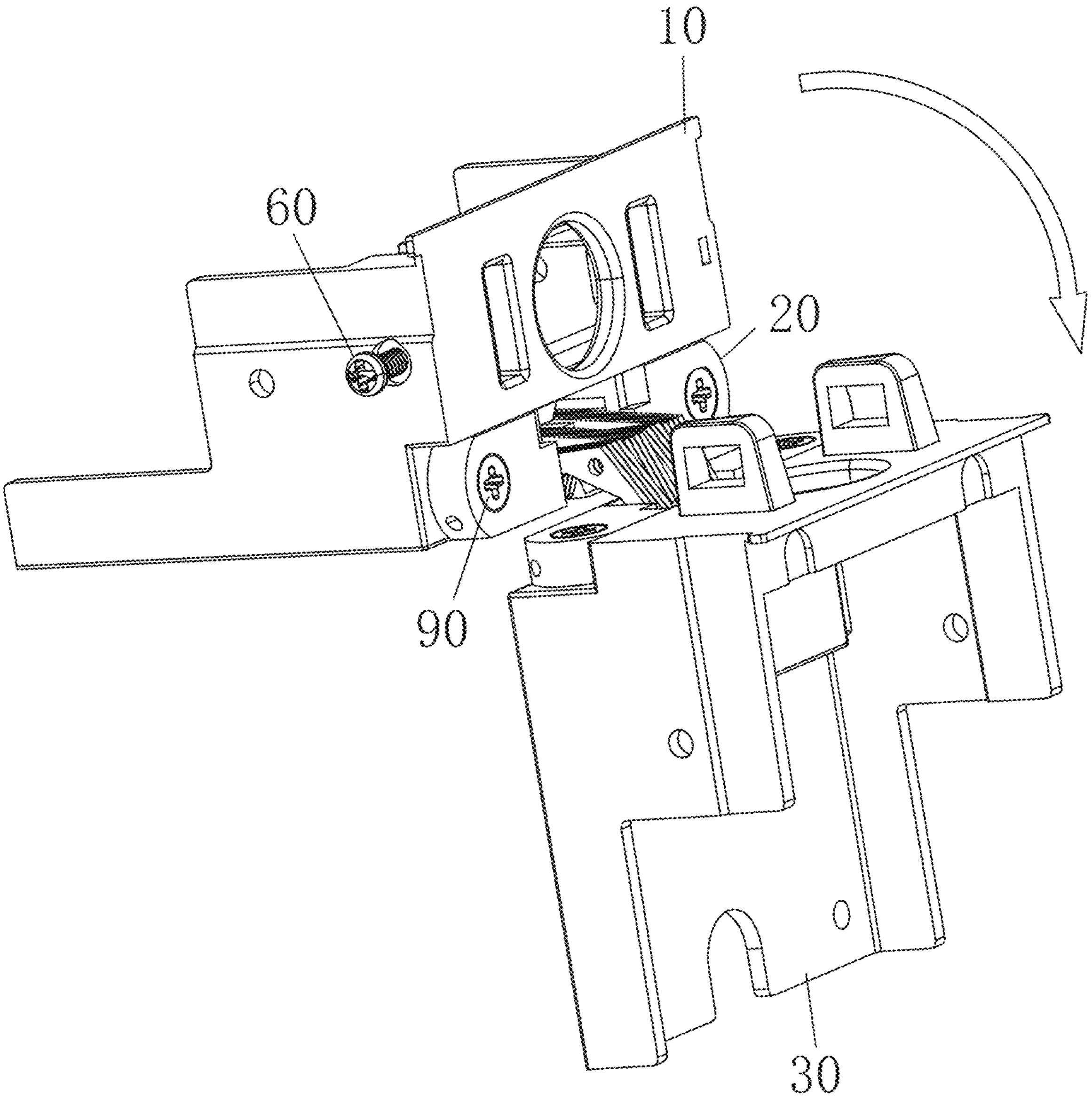
FIG. 13 is a schematic view of the folding self-locking structure of the present application from a horizontally unfolded state to a folded state.

Lastly, as shown in FIG. 13, from horizontal unfolding to folding (restoring), use a Phillips screwdriver to unscrew the lock accessory 60 about 5 mm. At this time, press the lock accessory 60 by hand to move the latch member inward (in the direction of spring compression) so that the lock tongue 501 on the mortise lock 50 exits the latch hole 402 of the second fixing member 30. At this time, let the second fixing member 30 move clockwise to a certain angle and then release the lock accessory 60. The mortise lock 50 will return to the initial installation position again under the action of the spring deformation force of the elastic member 70, and the unlocking process of the folding structure is now completed.

Figure 14:
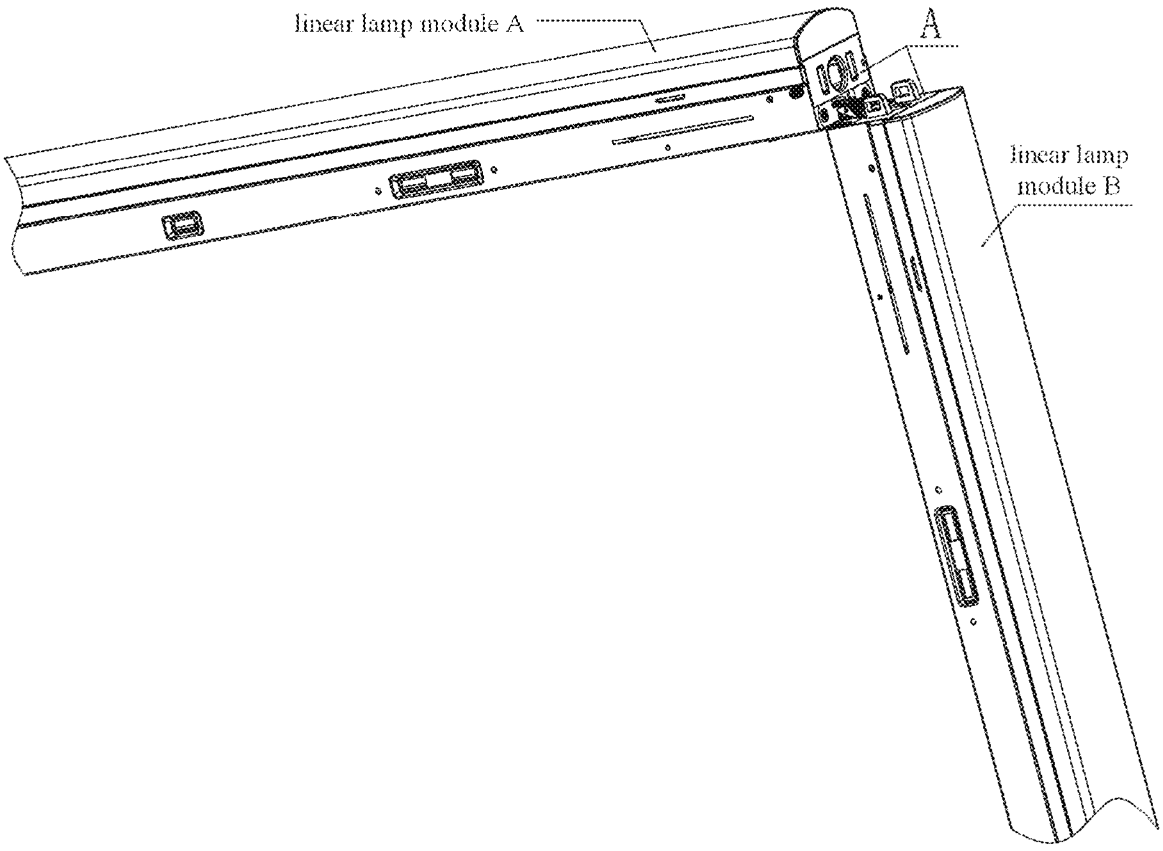
FIG. 14 is a schematic view of an application scenario of the folding self-locking structure of the present application.

As shown in FIG. 14, the present application further provides a lamp, including the folding self-locking structure A.

The present application can also be applied to linear lamps. Since conventional linear lamps are relatively long, they are difficult to package and transport, and have high costs. Therefore, installing a folding structure module on the lamp can shorten the packaging size, facilitate transportation, and reduce the cost of packaging and transportation.

The present application also offers the following advantages:

- easy installation: the first fixing member 10 and the second fixing member 30 have mounting holes, making them easy to install on other structures;
- rapid self-locking when rotating and closing, without the need for additional structural support;
- a reinforced locking structure makes the overall structure more secure;
- quick restoration without disassembling other structural parts;
- automatic self-locking: when the first fixing member 10 and the second fixing member 30 are deployed, the lock fastener 40 naturally engages the mortise lock 50, improving the convenience and speed of deployment and fastening;
- stable structure: the dual-point locking mechanism of “two lock fasteners 40+one mortise lock 50” creates a stable mechanical support structure to prevent loosening. When unfolded, the overall rigidity is enhanced, providing a higher load-bearing capacity;
- preventing accidental folding: the self-locking structure effectively prevents accidental folding due to vibration, collision, and other factors during use, ensuring safety;
- easy assembly and disassembly: when folding, simply remove the lock fastener 40 from the mortise lock 50 for quick folding;
- long service life: mechanical self-locking eliminates the need for additional power or complex components, resulting in high wear resistance and adaptability to repeated opening and closing operations;
- highly adaptable: suitable for use in lamps, linear lamps, foldable brackets, telescopic arms, folding door panels, and portable device supports;
- automatic reset: after unlocking, the elastic member 70 pushes the mortise lock 50 back, eliminating the need for manual reset; and
- after loosening the PM3*12 machine screw by approximately 5 mm, the PM3*12 screw can be used as a push pin to unlock the structure. Alternatively, the PM3*12 machine screw can be used to strengthen the locking mechanism and prevent unlocking. This allows for multiple functions.

The above embodiments of the present application are described in detail above in conjunction with the accompanying drawings. However, the present application is not limited to the specific details in the above embodiments. Within the technical concept of the present application, various equivalent transformations can be made to the technical solutions of the present application, and these equivalent transformations all fall within the scope of protection of the present application.

What is claimed is:

1. A lamp with a folding self-locking structure, wherein the folding self-locking structure comprises:

a first fixing member;

a hinge member, wherein a first end of the hinge member is connected to the first fixing member;

a second fixing member connected to a second end of the hinge member and being rotated to fold or unfold with the first fixing member;

two lock fasteners provided at the second fixing member on a side close to the hinge member along a preset direction; and a mortise lock provided in the first fixing member, wherein when the first fixing member and the second fixing member are rotated along the hinge member to a fully unfolded state, the two lock fasteners are respectively inserted into the mortise lock to limit and self-lock, so that the first fixing member and the second fixing member form a rigid whole.

2. The lamp according to claim 1, wherein:

a lock accessory connected to a first end of the mortise lock is provided at a first side of the first fixing member, and an elastic member connected to a second end of the mortise lock is provided at a second side of the first fixing member;

the lock accessory has a locked state and a released state;

in the locked state, the lock accessory applies a locking force to one end of the mortise lock so that the mortise lock is tightly matched with the two lock fasteners; and in the released state, after the lock accessory releases the locking force on one end of the mortise lock, an additional squeezing force is applied to the lock accessory, and the elastic member contracts due to the squeezing force, the mortise lock slides away from the lock fastener and rotates, so that the lock fastener and the mortise lock are rotated and separated along the hinge member to return to a folded state.

3. The lamp according to claim 2, wherein:

each of the two lock fasteners is provided with a curved inclined surface on the same side, a width of the inclined surface decreases from top to bottom, and a latch hole is provided at the lock fastener;

a lock tongue extending in a direction of the lock accessory and having a wedge-shaped protrusion is provided in the mortise lock; and the lock tongue and the inclined surface are progressively slidably matched, pushing the lock fastener towards the elastic member to allow the lock fastener to be continuously inserted into the mortise lock.

4. The lamp according to claim 2, wherein:

two ends of the mortise lock are respectively provided with a threaded portion close to the lock accessory and an assembly hole close to the elastic member; and the threaded portion, the assembly hole and a countersunk hole are concentric.

5. The lamp according to claim 1, wherein the first fixing member is further provided with two limiting members for limiting degree of freedom of the mortise lock, and the two limiting members are located at outer edges of the mortise lock.

6. The lamp according to claim 1, wherein:

the first fixing member comprises a first U-shaped bending portion that is semi-open and has stepped shapes on both sides;

a first enclosure is provided at one side of the first U-shaped bending portion close to the hinge member;

a first through hole is provided at a center of the first enclosure; and two through slots for the lock fastener to enter and exit are symmetrically provided on both sides of the first through hole.

7. The lamp according to claim 6, wherein:

the first U-shaped bending portion comprises a first side plate and a second side plate opposite to the first side plate;

the first side plate is provided with a countersunk hole for the lock accessory to enter and exit;

an inner wall of the second side plate is provided with a limiting groove for limiting the elastic member; and the countersunk hole and the limiting groove are concentric.

8. The lamp according to claim 7, wherein the first side plate, the second side plate, the first enclosure, a top plate and a step are enclosed to form a semi-open chamber for assembling the mortise lock, and the mortise lock is located in the semi-open chamber for directional displacement.

9. The lamp according to claim 1, wherein:

the second fixing member comprises a second U-shaped bending portion that is semi-open and has stepped shapes on both sides;

a second enclosure is provided on a side of the second U-shaped bending portion close to the hinge member; and a second through hole is provided at a center of the second enclosure.

* * * * *